United States Patent Office

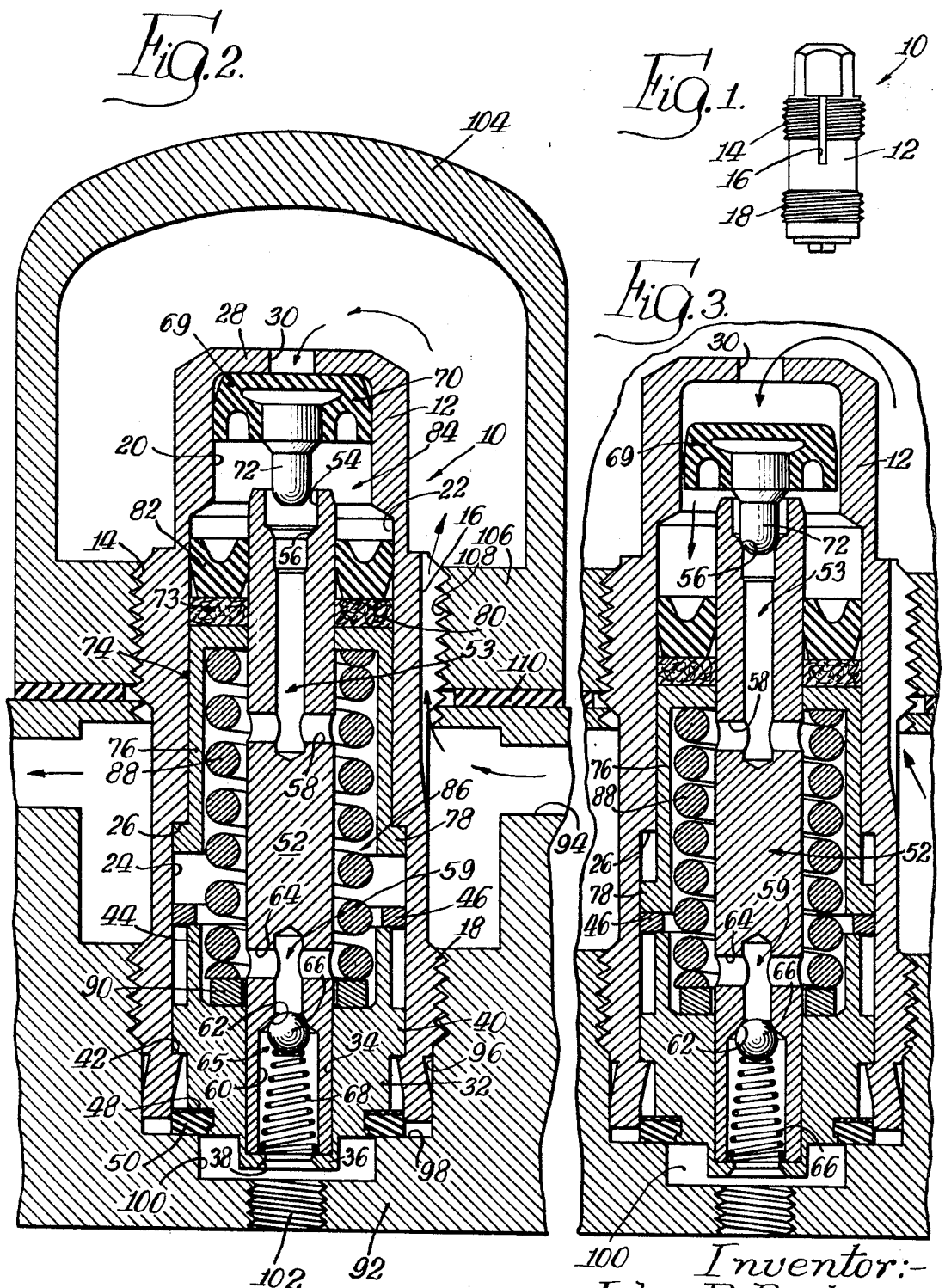

3,393,841
Patented July 23, 1968

3,393,841
LUBRICANT MEASURING VALVE
John R. Brehmer, Deerfield, Ill., assignor to Stewart-Warner Corporation, Chicago, Ill., a corporation of Virginia
Filed Dec. 14, 1966, Ser. No. 601,729
4 Claims. (Cl. 222—335)

ABSTRACT OF THE DISCLOSURE

The following specification describes a lubricant measuring valve in which an admittance valve opens one port to a primary chamber in response to the application of lubricant pressure and closes a second port formed in a stem passageway leading to a secondary or measuring chamber through a spring biased piston. The pressure is then applied to the piston to discharge lubricant from the measuring chamber. A stem on the admittance valve is used for guiding the valve in the stem pasageway and on release of the lubricant pressure, the spring biased piston causes the admittance valve to open the stem passageway and drives the lubricant from the admittance chamber into the measuring chamber. The measuring chamber communicates with the stem passageway and the discharge outlet at opposite ends to enable the discharge of entrapped air in accordance with the valve position.

---

The present invention relates to an improved lubricant measuring or metering valve adapted to discharge under hydraulic pressure supplied from a pump in a centralized lubricating system.

In a centralized lubricating system, lubricant under line pressure is cyclically introduced into a series of measuring valves and lubricant is cyclically metered or discharged from the valves. The measuring valves may be of several different types.

In one type of measuring valve a slide valve opens a port under hydraulic pressure to permit flow through a bypass passageway against a large area piston which is drivenback against the slide valve by the fluid pressure to in turn close the bypass passageway. Lubricant between the piston and the valve is driven to the outlet by the piston and after the fluid pressure is relieved, the lubricant in the bypass passageway is passed to the space between the piston and slide valve under spring pressure. The just described valve advantageously subjects opposite sides of the seals to fluid pressure; however, the necessity to move the slide valve through a seal tends to shorten the seal life, while the need for a bypass passageway contributes to manufacturing expense and restricts accurate metering of small lubricant quantities.

In another type of metering valve, which is used for small lubricant quantities, an injector piston forces lubricant through an outlet check valve on the application of hydraulic pressure thereto. As the piston moves, it opens a side port and lubricant under pressure passes through the side port to fill a measuring valve having a spring loaded piston. On relief of the pressure the injector piston returns to normal, thereby permitting the measuring valve piston to discharge its fluid into the space between the drive piston and outlet port. This measuring valve is both expensive and difficult to manufacture, while the seal for the measuring valve piston is exposed to hydraulic pressure on one side and atmosphere on the other, thereby facilitating failure.

In still another type measuring valve, as shown in a bulletin "Service Instruction for 380991 Series Accumatic Insert Measuring Valves," prepared by the Alemite Marketing Service Department, Stewart-Warner Corporation, 1826 W. Diversey Blvd., Chicago, Ill., a spring loaded piston is driven in one direction by lubricant under pressure. A stem having a central passage is encircled by the piston and the central passage is closed by a first valve under lubricant presssure. The lubricant fills the space above the piston. On relief of the pressure, the spring loaded piston is returned to open the central passage and drive the lubricant to the outlet through that passage. This type of valve is economical and provides accurate metering over a large range of volumes as low as .003 cu. in., but suffers from the primary problem that discharge occurs under spring pressure.

To overcome the above mentioned and other problems, the present invention proposes to modify the valve described in said bulletin by simply connecting the stem pasageway to the space between the piston and the valve body instead of directly to the outlet, and connecting that space to the discharge outlet through a second passageway in said stem. Therefore, when the piston is driven by the fluid pressure, it extrudes the lubricant in the space between the piston and valve body to the discharge outlet under central hydraulic pressure, while placing opposite sides of the piston seal under lubricant pressure.

It is therefore an object of the present invention to provide an economical lubricant measuring valve of the type adapted to discharge lubricant under pressure provided from a central pump.

It is another object of the present invention to provide an economical lubricant measuring valve capable of accurately metering a large range of lubricant quantities.

It is a further object of the present invention to provide an economical lubricant measuring valve having a piston seal exposed to lubricant pressure on opposite sides thereof.

Now, in order to acquaint those skilled in the art with the manner of constructing and using lubricant measuring valves in accordance with the principles of the present invention, there will be described in connection with the accompanying drawing a preferred embodiment of the invention.

In the drawing:

FIGURE 1 is a side elevational view of the lubricant measuring valve of the present invention;

FIGURE 2 is an enlarged median longitudinal sectional view of the valve of FIGURE 1 and of a dome and a fragmentary portion of a manifold associated therewith; and FIGURE 3 is a median longitudinal sectional view corresponding generally to FIGURE 2, but showing the moving valve parts in a different operating position.

Referring now to FIGURES 1 and 2, there is indicated generally by the reference numeral 10 a lubricant measuring valve incorporating the principles of the present invention. The valve 10 comprises an elongated casing 12 having an externally threaded section 14 with a longitudinal slot 16 formed in one side thereof, and also having an externally threaded section 18. The casing 12 is formed internally with a first cylindrical bore section 20, a second cylindrical bore section 22 having a diameter greater than the diameter of the first bore section 20, and a third cylindrical bore section 24 having a diameter greater than the diameter of the second bore section 22. The casing 12 at the junction of the second and third bore sections 22 and 24 presents an annular shoulder or first stop means 26.

The casing 12 further includes an integral first end wall 28 through which an axial inlet 30 is provided, and a second end wall 32 in the form of a separate member having a central axial opening 34 and a projection 36 through which an outlet 38 is provided. The end wall member 32 has a flange portion 40 which is received in the bore section 24 and which is restrained against movement outwardly of the casing by ledge means 42 projecting radially from the casing sidewall. The end wall member 32 at its inner end is provided with an annular sleeve portion 44 that presents second stop means either directly itself or indirectly through a spacer 46, and at its outer end serves to support a washer 48 and a gasket 50.

An elongated stem or rod member 52 is arranged coaxially within the casing 12, and at one end is secured, as by a press fit, in the opening 34 of the end wall member 32. The rod member 52 is formed with first passageway means 53 comprised of an axial opening 54 presenting an intermediate valve seat 56 and a transverse port 58, and with second passageway means 59 comprised of an axial opening 60 presenting an intermediate valve seat 62 and a transverse port 64. Mounted within the axial opening 60 is check valve means 65 in the form of a ball valve 66 normally biased into engagement with the valve seat 62 by a spring 68 which seats against the inner face of the end wall projection 36.

Slidably mounted in the first bore section 20 is valve means 69 comprised of a resilient valve head 70 and an axial valve stem 72. The valve means 69 is movable between a first position (FIGURE 2) in which the valve head 70 engages the casing end wall 28 for closing the inlet 30, and a second position (FIGURE 3) in which the valve stem 72 engages the valve seat 56 in the axial opening 54 for closing the first passageway means 53.

Also slidably mounted in the casing 12 is piston means 73 comprised of a hollow piston 74 having a body portion 76 slidable in the second bore section 22 and an annular flange portion 78 slidable in the third bore section 24. The piston means 73 further includes a washer 80 and a resilient seal 82 at the end of the piston 74 opposite the flange portion 78. The piston means 73 is slidable along the rod member 52 and serves to define in the casing 12 a primary chamber 84 and a secondary chamber 86 coaxial therewith. The piston means 73 is movable between a first position (FIGURE 2) in which the piston flange portion 78 abuts the first stop means 26, and a second position (FIGURE 3) in which the flange portion 78 abuts the second stop means constituted either by the spacer 46 or the end of the sleeve portion 44.

When the piston means 73 is in its first position, the volume of the secondary chamber 86 is at a maximum, and when the piston means is in its second position, the volume of the secondary chamber 86 is at a minimum. The stroke of the piston means 73 may be varied by altering the size of the spacer 46 or by eliminating the use of a spacer entirely. The piston means 73 is normally biased to the position shown in FIGURE 2 by means of a coil spring 88 arranged concentrically of the rod member 52 and extending between the head end of the piston 74 and a washer 90 seated against the end wall member 32 within the confines of the sleeve portion 44. As will be observed in FIGURE 2, the first passageway means 53 includes a simple axial drill hole and a cross drill hole in the stem or rod member 52 and extends between the primary and secondary chambers 84 and 86. The second passageway means 59 likewise includes a simple axial drill hole and a cross drill hole in the stem or rod member and extends between the secondary chamber 86 and the outlet 38.

The valve 10 of the present invention is adapted for use as part of a centralized lubricating system. In a system of this type, a series of identical valves 10 are mounted in spaced relation in a manifolid 92 which is formed therethrough with continuous passageway means 94. Also, at each valve location, the manifold 92 is provided with a partially threaded cavity 96 presenting an annular shoulder 98, a counterbore 100 and a threaded discharge opening 102. The discharge opening 102 is associated directly or through suitable conduit with a surface or part to be lubricated. In assembly, the threaded section 18 of the valve casing 12 is threaded into the manifold cavity 96 until the gasket 50 firmly engages the manifold shoulder 98. Each valve 10 is enclosed by a cap or dome member 104 which has an end wall 106 threaded, as at 108. The dome member 104 is threaded onto the casing section 14, and a gasket 110 provides a seal between the dome member 104 and the manifold 92.

In the operation of the lubricating system, lubricant is withdrawn from a reservoir by a pump and supplied under line pressure to the manifold passageway 94. At periodic intervals, the manifold passageway 94 is vented to the lubricant reservoir and relief of line pressure is thereby cyclically effected. Since the means for supplying lubricant to, and the vent means for, the pasageway 94 is conventional, a detailed showing thereof and a further description herein is believed unnecessary. Lubricant entering the passageway 94 on the pressure cycle passes through the casing slot 16 into the dome 104 and through the valve inlet 30. The pressurized lubricant moves the valve means 69 from the position shown in FIGURE 2 until the valve stem 72 engages the valve seat 56 (FIGURE 3) for closing the first passageway means 53 in the valve 10. At the same time, the pressurized lubricant flows about the outer periphery of the resilient valve head 70 thus filling the primary chamber 84 and moving the piston means 73 from its first position shown in FIGURE 2 to its second position shown in FIGURE 3 to compress the coil spring 88. When the system is vented, and the line pressure is relieved, the coil spring 88 returns the piston means 73 from the position shown in FIGURE 3 to the position shown in FIGURE 2. During the return stroke of the piston means 73, the valve means 69 is returned from the position shown in FIGURE 3 to the position shown in FIGURE 2, thereby withdrawing the valve stem 72 from engagement with the valve seat 56, and lubricant is forced from the primary chamber 84 through the first passageway means 53 to the secondary chamber 86.

On the succeeding pressure cycle, the pressurized lubricant again moves the valve means 69 and the piston means 73 to the positions shown in FIGURE 3, and the primary chamber 84 is filled with an additional amount of lubricant. Also, the piston means 73 during the pressure cycle forces lubricant from the secondary chamber 86 through the second passageway means 59 past the check valve means 65 and through the casing outlet 38 and the manifold discharge opening 102. During the discharge, the fluid pressure is maintained on opposite sides of seal 82, thereby contributing to its effectiveness and life. The quantity of lubricant discharged is simply dependent upon the travel of the discharging piston means 73, which may be set to provide a large range of lubricant quantities extending as low as .003 cu. in. The pressure and vent cycles are repeated in timed sequence as desired whereby lubricant is cyclically admitted to, and discharged from, the valve 10.

From the foregoing description, it will be appreciated that lubricant is delivered by the valve 10 when the latter is pressurized—that is, lubricant is discharged from the valve outlet 38 and directed through the manifold discharge opening 102 under action of line pressure due to operation of the piston means 73 in its discharge stroke by the pressurized lubricant entering the primary chamber 84. The quantity of lubricant cyclically discharged from the valve may be readily adjusted by varying the stroke of the piston means 73 in the manner disclosed hereinabove. Additionally, the disclosed valve construction eliminates the possible development of a fluid lock that might otherwise result from leakage around the packings, reduces any pressure differnertial across the packings thus increasing packing life, and permits use of larger lubrication systems. Finally, in the event of packing failure, the valve over lubricates rather than under lubricates and thus is "fail safe."

While there has been shown and described a preferred embodiment of the present invention, it will be understood by those skilled in the art that various rearrangements and modifications may be made therein without departing from the spirit and scope of the invention.

I claim:

1. A lubricant measuring valve comprising an elongated casing having an inlet through which lubricant under line pressure is adapted to be admitted cyclically and having an outlet through which lubricant is adapted to be discharged cyclically, piston means in said casing and defining therein a primary chamber and a secondary chamber, said piston means being movable between a first position where the volume of said secondary chamber is at a maximum and a second position where the volume of said secondary chamber is at a minimum, spring means normally biasing said piston means to its said first position, a stem coaxial with said piston and having a first passageway means therein extending between said primary and secondary chambers, a second passageway means in said stem extending between said secondary chamber and said outlet, valve means movable in said casing between a first position closing said inlet and a second position closing said first passageway means, guide means on said valve means with said guide means located in said first passageway means in both said valve means first position and said valve means second position for guiding movement of said valve means between said first and second valve means positions, said valve means upon admission through said inlet of lubricant under line pressure being disposed in said second position while lubricant under line pressure is forced into said primary chamber, said piston means upon admission of lubricant under line pressure to said primary chamber being moved to its said second position against the bias of said spring means whereby lubricant is forced from said secondary chamber through said second passageway means and said outlet, and said spring means upon relief of line pressure at said inlet returning said piston means to its said first position whereby lubricant is forced from said primary chamber through said first passageway means to said secondary chamber.

2. A lubricant measuring valve comprising an elongated casing having an inlet through which lubricant under line pressure is adapted to be admitted cyclically and having an outlet through which lubricant is adapted to be discharged cyclically, piston means in said casing and defining therein a primary chamber and a secondary chamber, said piston means being movable between a first position where the volume of said secondary chamber is at a maximum and a second position where the volume of said secondary chamber is at a minimum, spring means normally biasing said piston means to its said first position, a stem passing through said piston means, a first passageway means extending through said stem between said primary and secondary chambers and communicating with said secondary chamber adjacent said piston means second position to permit air entrapped in said secondary chamber to move into said first passageway means in response to movement of said piston means to said second position in the event said second position is below said first position, second passageway means extending through said stem between said secondary chamber and said outlet, valve means movable in said casing between a first position closing said inlet and a second position closing said first passageway means, guide means on said valve means located in said first passageway means in both said valve means first position and said valve means second position for guiding movement of said valve means between said first and second valve means positions, said valve means upon admission through said inlet of lubricant under line pressure being disposed in said second position while lubricant under line pressure is forced into said primary chamber, said piston means upon admission of lubricant under line pressure to said primary chamber being moved to its said second position against the bias of said spring means whereby lubricant is forced from said secondary chamber through said second passageway means and said outlet while air in said secondary chamber is moved into said stem first passageway means, and said spring means upon relief of line pressure at said inlet returning said piston means to its said first position while said valve means is returned to its said first position whereby lubricant is forced from said primary chamber through said first passageway means to said secondary chamber and air in said first passageway is permitted to escape to said primary chamber.

3. The valve of claim 2 including stop means defined by a spacer of selected thickness to vary the stroke of said piston means to control the volume of lubricant measured by said secondary chamber between .003 cubic inch and substantially larger volumes.

4. The valve claimed in claim 2 in which said second passageway means communicates with said secondary chamber at a position located adjacent the end of said secondary chamber opposite said piston whereby entrapped air is extruded from said measuring chamber in response to said piston means moving to said second position and said second passageway means being located above said piston means.

References Cited

UNITED STATES PATENTS 2,817,462 12/1957 Lipinski _____ 222—335 X
3,119,463 1/1964 Jackson _____ 222—335 X WALTER SOBIN, *Primary Examiner.*